(12) United States Patent
Ogura et al.

(10) Patent No.: US 8,666,225 B2
(45) Date of Patent: Mar. 4, 2014

(54) DIGITAL CINEMA MANAGEMENT DEVICE AND DIGITAL CINEMA MANAGEMENT METHOD

(75) Inventors: Misato Ogura, Kanagawa (JP); Katsumi Ogawa, Kanagawa (JP)

(73) Assignee: Sony Corporation (JP)

( * ) Notice: Subject to any disclaimer, the term of this patent is extended or adjusted under 35 U.S.C. 154(b) by 393 days.

(21) Appl. No.: 12/661,305

(22) Filed: Mar. 15, 2010

(65) Prior Publication Data
US 2010/0247070 A1 Sep. 30, 2010

(30) Foreign Application Priority Data
Mar. 27, 2009 (JP) ................ P2009-079885

(51) Int. Cl.
*H04N 9/80* (2006.01)
(52) U.S. Cl.
USPC .......................... 386/248; 386/239
(58) Field of Classification Search
USPC ............ 386/200–234, 291–299; 725/86–104, 725/115, 145
See application file for complete search history.

(56) References Cited

U.S. PATENT DOCUMENTS

| | | | |
|---|---|---|---|
| 6,812,994 B2 | 11/2004 | Bubie et al. | |
| 7,034,916 B2 | 4/2006 | Bubie et al. | |
| 7,236,227 B2 | 6/2007 | Whyte et al. | |
| 2003/0065446 A1* | 4/2003 | Ootomo et al. | 702/5 |
| 2005/0057724 A1* | 3/2005 | Patton et al. | 352/40 |
| 2005/0076372 A1* | 4/2005 | Moore et al. | 725/78 |
| 2007/0153910 A1* | 7/2007 | Levett | 375/240.25 |
| 2007/0168877 A1* | 7/2007 | Jain et al. | 715/772 |
| 2007/0204322 A1 | 8/2007 | Whyte et al. | |
| 2009/0019240 A1* | 1/2009 | Kawasaki | 711/154 |

FOREIGN PATENT DOCUMENTS

| | | |
|---|---|---|
| JP | 08-123869 | 5/1996 |
| JP | 2002-312538 A | 10/2002 |
| JP | 2003-244625 A | 8/2003 |
| JP | 2004-222245 A | 8/2004 |
| JP | 2005-286561 A | 10/2005 |

OTHER PUBLICATIONS

Japanese Office Action dated Oct. 15, 2013.

* cited by examiner

*Primary Examiner* — Hung Dang
(74) *Attorney, Agent, or Firm* — Lerner, David, Littenberg, Krumholz & Mentlik, LLP

(57) ABSTRACT

A digital cinema management device includes a control unit that manages schedules of contents exhibited by playback devices and controls a representation of a management window for performing the schedule management, in which the control unit determines an urgent level in accordance with the number of days left until an exhibition day when the requirements for exhibiting contents with the playback devices in accordance with an exhibition schedule are not satisfied and switches the properties of the representation on the management window in accordance with the determined urgent level.

12 Claims, 14 Drawing Sheets

FIG. 6A

| THE NUMBER OF DAYS LEFT UNTIL EXHIBITION DAY | STATUS | URGENT LEVEL |
|---|---|---|
| CURRENT TIME IS WITHIN Me DAYS UNTIL EXHIBITION DAY OF EVENT | FATAL STATUS | 3 |
| CURRENT TIME IS WITHIN Ne DAYS UNTIL EXHIBITION DAY OF EVENT | ERROR STATUS | 2 |
| CURRENT TIME IS Ne DAYS OR EARLIER THAN EXHIBITION DAY OF EVENT | WARNING STATUS | 1 |

WHERE $Me < Ne$

FIG. 6B

| THE NUMBER OF DAYS LEFT UNTIL EXHIBITION DAY | STATUS | URGENT LEVEL |
|---|---|---|
| CURRENT TIME IS WITHIN Md DAYS UNTIL EXHIBITION DAY OF EVENT | FATAL STATUS | 3 |
| CURRENT TIME IS WITHIN Nd DAYS UNTIL EXHIBITION DAY OF EVENT | ERROR STATUS | 2 |
| CURRENT TIME IS Nd DAYS OR EARLIER THAN EXHIBITION DAY OF EVENT | WARNING STATUS | 1 |

WHERE $Md < Nd$

FIG. 6C

| THE NUMBER OF DAYS LEFT UNTIL EXHIBITION DAY | STATUS | URGENT LEVEL |
|---|---|---|
| CURRENT TIME IS WITHIN Mk DAYS UNTIL EXHIBITION DAY OF EVENT | FATAL STATUS | 3 |
| CURRENT TIME IS WITHIN Nk DAYS UNTIL EXHIBITION DAY OF EVENT | ERROR STATUS | 2 |
| CURRENT TIME IS Nk DAYS OR EARLIER THAN EXHIBITION DAY OF EVENT | WARNING STATUS | 1 |

WHERE $Mk < Nk$

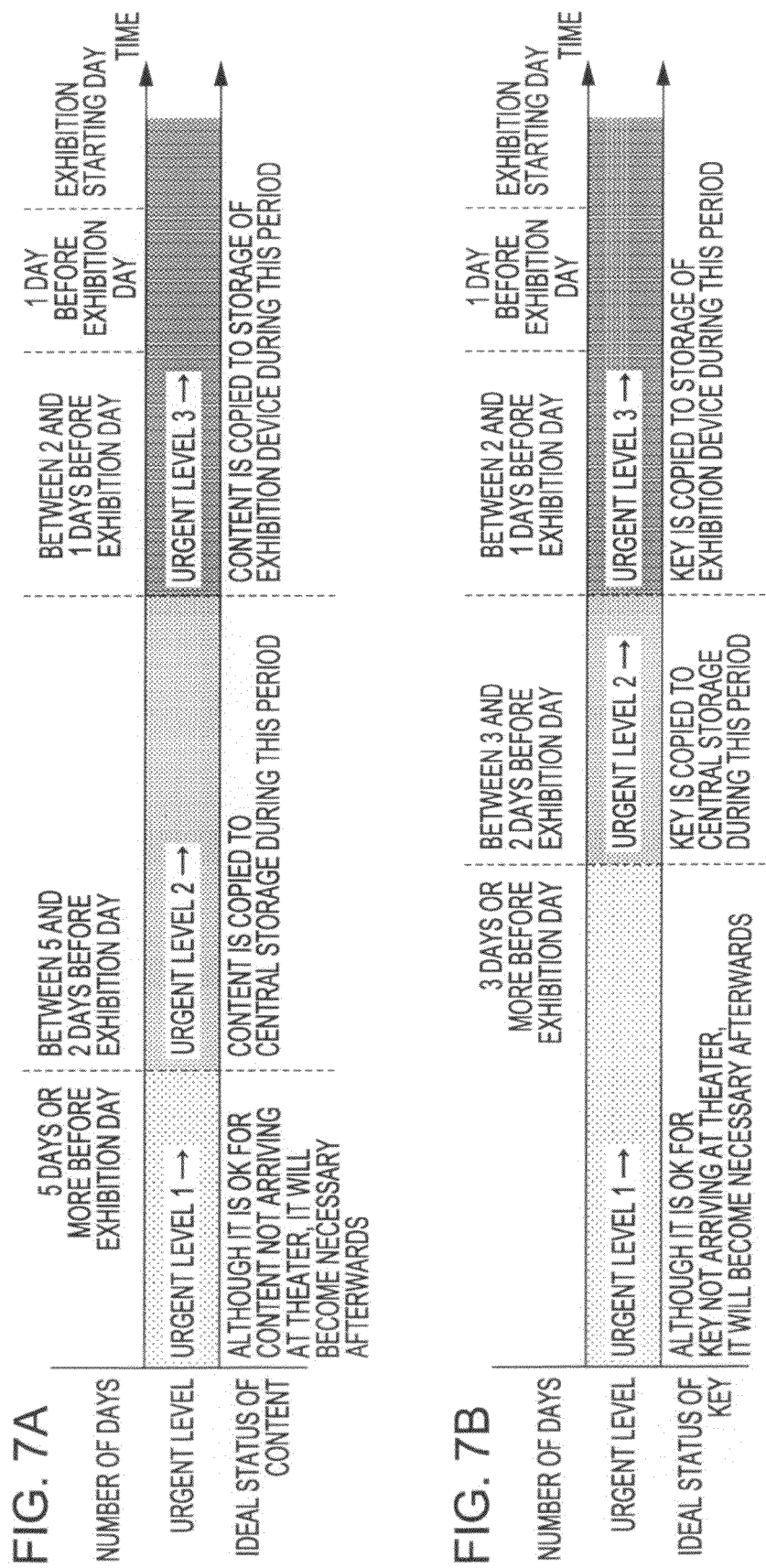

FIG. 9

| STATUS | URGENT LEVEL | BACKGROUND COLOR |
|---|---|---|
| FATAL STATUS | 3 | (RED) |
| ERROR STATUS | 2 | (ORANGE) |
| WARNING STATUS | 1 | (YELLOW) |

FIG. 12

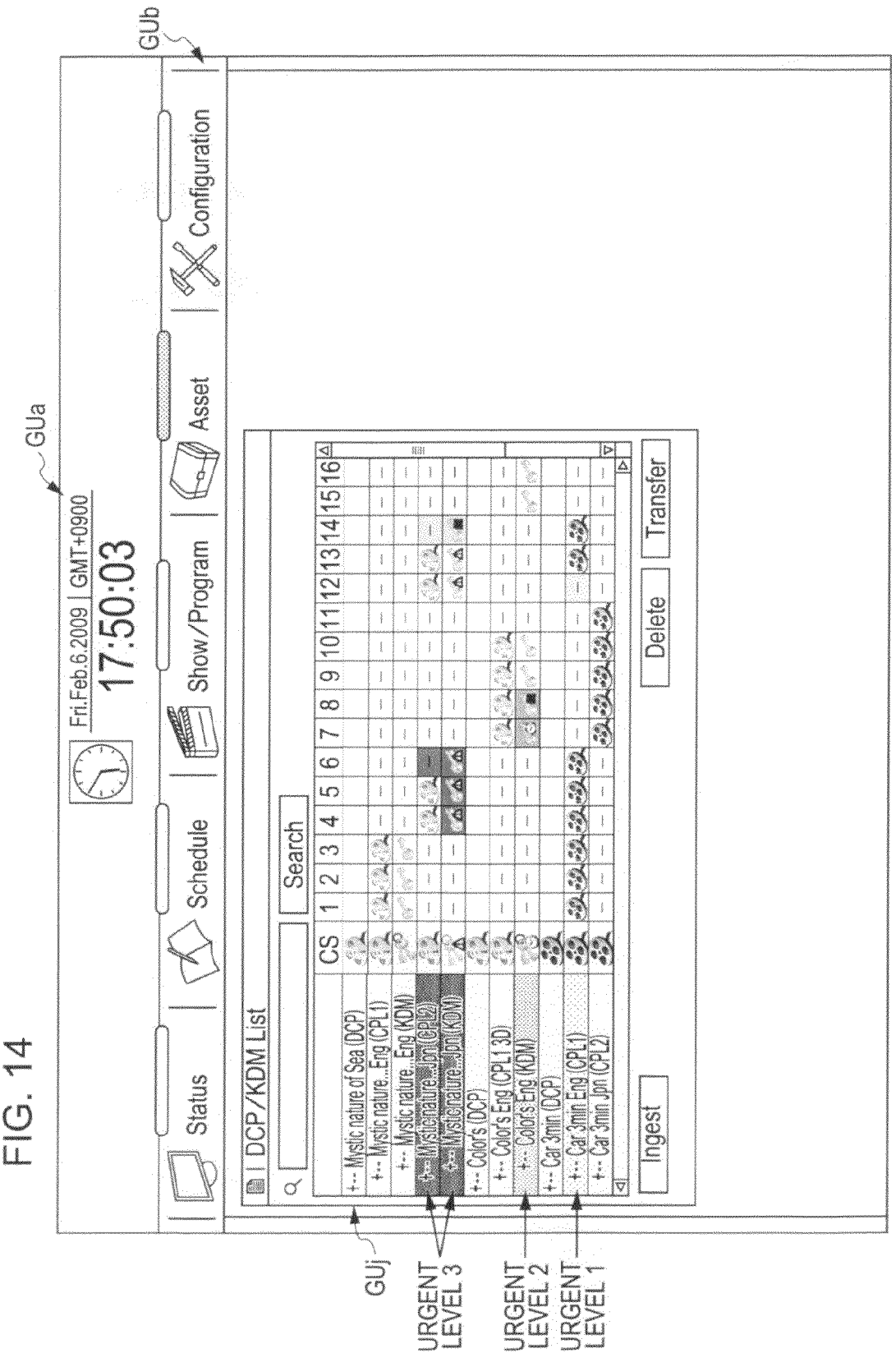

DIGITAL CINEMA MANAGEMENT DEVICE AND DIGITAL CINEMA MANAGEMENT METHOD

CROSS-REFERENCE TO RELATED APPLICATION

The present application claims priority from Japanese Patent Application No. JP 2009-079885 filed in the Japanese Patent Office on Mar. 27, 2009, the entire content of which is incorporated herein by reference.

BACKGROUND OF THE INVENTION

1. Field of the Invention

The present invention relates to a digital cinema management device and a digital cinema management method. More particularly, the present invention relates to a technique of displaying an urgent level when data of content that is scheduled for exhibition are not acquired.

2. Description of the Related Art

With the progress of digital technology, the environment of the movie industries is converting from film to digital signals, and movies are produced using video equipment and played using a projector and the like. For realization of such a digital cinema, a data compression technique, an encryption technique for copyright protection, and the like are used in addition to picture and sound techniques for a faithful representation of images and sound intended by a producer.

When movies are shown on screens, data of a certain format created by a server installed in a movie distribution company are provided to individual theaters, and the data provided to the individual theaters are played with playback devices, whereby exhibition of a digital cinema is carried out. As the format of the data provided from the movie distribution company to the individual theaters, a format is used, for example, which is called a Digital Cinema Package (DCP), and which is compliant with the specifications proposed by the Digital Cinema Initiatives (DCI).

Japanese Unexamined Patent Application Publication No. 2003-244625 discloses a technique of transmitting data regarding the schedules for movies to be exhibited to an exhibition server unit and transmitting the contents of the movies to a cinema server so that the operations of editing or reorganizing the contents to be exhibited and creating the exhibition schedule can be performed by a single operation on a screen display.

SUMMARY OF THE INVENTION

However, when the number of auditoriums increases, the management of the schedule as to which content will be exhibited in which auditorium becomes complex. In addition, it will be unable to exhibit the content on the scheduled time unless data and the like of the content to be exhibited are supplied to a playback device ahead of an exhibition start time. For this reason, it is necessary to perform operations for checking an exhibition schedule, contents stored in the playback device and supplying data and the like of contents which are necessary ahead of the exhibition start time to the playback device. However, when the number of auditoriums is too large, it is necessary to check not only the exhibition schedule but also the contents stored in the playback device, but it is difficult to prioritize the operations in a simple and easy manner.

It is therefore desirable to provide a digital cinema management device and a digital cinema management method capable of determining the priorities of operations necessary for preparation of an exhibition.

According to an embodiment of the present invention, there is provided a digital cinema management device including a control unit that manages schedules of contents exhibited by playback devices and controls a representation of a management window for performing the schedule management, in which the control unit determines an urgent level in accordance with the number of days left until an exhibition day when the requirements for exhibiting contents with the playback devices in accordance with an exhibition schedule are not satisfied and switches the properties of the representation on the management window in accordance with the determined urgent level.

In the embodiment of the present invention, the control unit displays an arrangement representation for each playback device in the management window, for example, in which representations representing the exhibited contents are arranged on a time axis. When the requirements for exhibiting contents with the playback devices in accordance with an exhibition schedule are not satisfied, the control unit compares a preset threshold value with the number of days left until the exhibition day and determines the urgent level in accordance with the comparison result. Furthermore, the control unit switches a background color, for example, of an arrangement representation displayed with the playback devices and the contents exhibited by the playback devices in accordance with the determined urgent level. Furthermore, the control unit displays a representation representing the requirements that are not satisfied in the management window so that representations of exhibited contents are correlated with the arrangement representation arranged on the time axis. Furthermore, the control unit switches a transparency of a representation of the content when the requirements that are not satisfied when the urgent level is determined are predetermined requirements.

According to another embodiment of the present invention, there is provided a digital cinema management method including the steps of causing a display unit to display a management window for managing schedules of contents exhibited by playback devices; and causing a control unit to determine an urgent level in accordance with the number of days left until an exhibition day when the requirements for exhibiting contents with the playback devices in accordance with an exhibition schedule are not satisfied and switch the properties of the representation on the management window in accordance with the determined urgent level.

According to the embodiments of the present invention, when a confirmation item that does not satisfy the exhibition requirements is detected among the confirmation items which are set in advance in order to perform exhibition of contents with the playback devices in accordance with the exhibition schedule, the urgent level is determined in accordance with the number of days left until the exhibition day, and the properties of a representation on the management window are switched in accordance with the determined urgent level. Therefore, it is possible to identify easily the priorities of operations necessary for preparation of an exhibition.

BRIEF DESCRIPTION OF THE DRAWINGS

FIGS. 6A to 6C are diagrams illustrating check tables.

FIGS. 7A and 7B are diagrams illustrating determination results of an urgent level.

FIG. 9 is a diagram illustrating switching of representation properties based on an urgent level.

FIG. 12 is a first diagram illustrating a case where the schedule representation and the ToDo list representation are linked to each other.

FIG. 14 is a diagram illustrating a DCP/KDM list representation.

DESCRIPTION OF THE PREFERRED EMBODIMENTS

Figure 1:
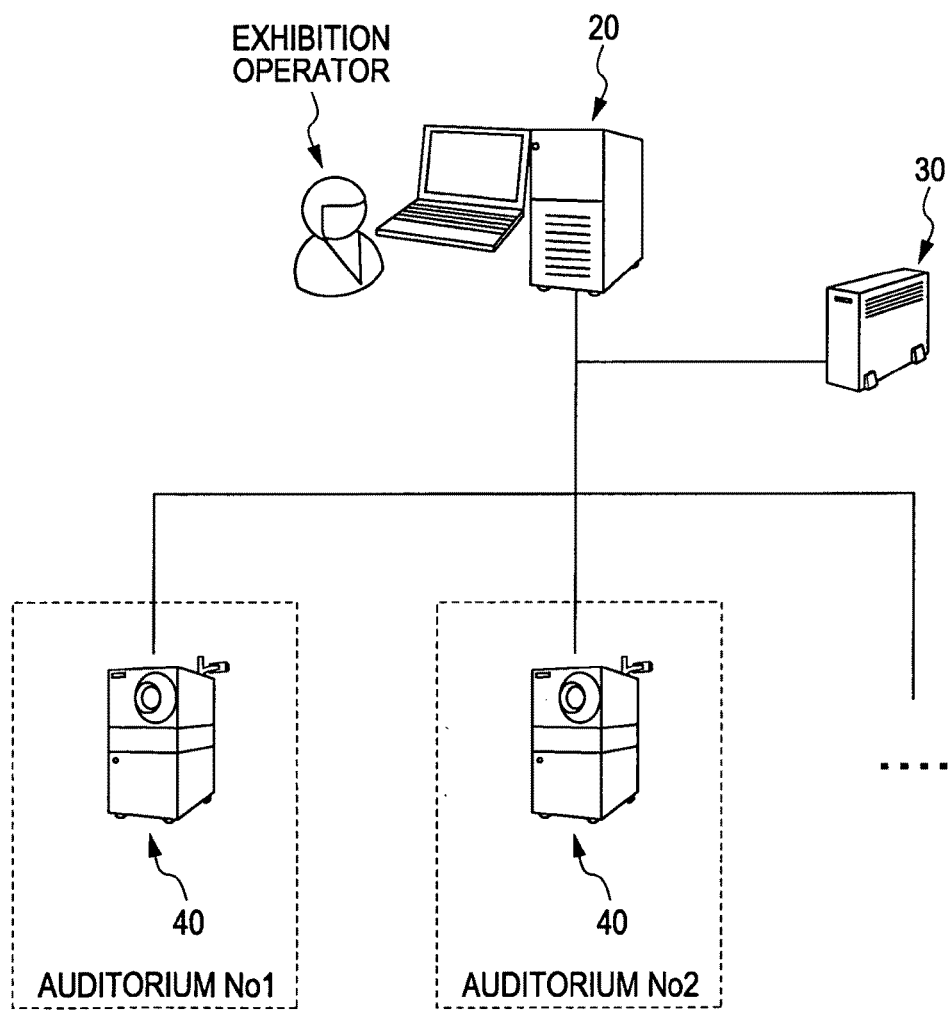
FIG. 1 is a diagram illustrating a schematic configuration of a digital cinema system.

Hereinafter, preferred embodiments of the present invention will be described. The description will be given in the following order:

1. Configuration of Digital Cinema System;
2. Structure of Digital Cinema Package (DCP);
3. Configuration of Management Device and Playback Device; and
4. Operation of Management Device 1. Configuration of Digital Cinema System FIG. 1 illustrates a schematic configuration of a digital cinema system. A digital cinema system 10 is configured by using a digital cinema management device (hereinafter referred to as a "management device") 20, a central storage device (hereinafter referred to as a "storage device") 30, and a playback device 40 which is installed in each auditorium.

The management device 20 creates the schedules for contents to be exhibited by the playback device 40. Moreover, the management device 20 reads data of the contents exhibited by the playback device 40 from the storage device 30 and supplies the data to the playback device 40.

The storage device 30 stores the data and the like of the contents exhibited by the playback device 40. The storage device 30 may be a storage device that uses redundant arrays of inexpensive disks (RAID), for example.

The playback device 40 includes a content storage unit, a decoding unit, a projector, a sound output unit, and the like. The playback device 40 supplies the data of contents stored in the content storage unit to the decoding unit according to a schedule. The decoding unit decodes the data of contents to obtain data of pictures and subtitles and outputs them to the projector. Moreover, the decoding unit decodes the data of contents to obtain data of sound and outputs them to the sound output unit. In this way, exhibition of a digital cinema can be carried out by the playback device 40 that is installed in an auditorium.

The management device 20 is connected to a theater ticketing system (not illustrated) that provides an exhibition schedule to newspapers or other sources ahead of a scheduled exhibition day. The exhibition schedule includes information on events representing which movies will be exhibited on which day and time and in which auditorium. The management device acquires the information on the events from the theater ticketing system to create schedules.

For example, the management device 20 creates the schedules using a show template. The management device 20 displays a show template. An exhibition operator sets cinema advertisement (theater advertisements), trailers (movie announcements), and main features of movies according to the show template. For example, when a format, called a Digital Cinema Package (DCP), is used, a composition playlist CPL described later or a program containing a group of composition playlists CPLs is set in the show template. The use of such a show template facilitates the scheduling operation of the exhibition operator.

Here, an exhibition of one event based on the list set in the show template is referred to as a "show." Moreover, the lists set in the show template are collectively referred to as a "show playlist". That is to say, a show of one event is presented by performing playback or the like of data based on the show playlist. Furthermore, by correlating events with the show playlist, a show can be presented at the time of each event by performing playback or the like of data based on the show playlist at the time described in the events. During the show, the lighting, the screen size, and the like are controlled.

In addition, the format used with the digital cinema system 10 is not limited to the Digital Cinema Package DCP (hereinafter referred to as DCP), but an MPEG format may be used for a cinema advertisement, for example.

In addition, content data are often encrypted in order to prevent illegal access, copying, editing, and playback. In this case, a key for use in decoding the encrypted data has to be acquired ahead of content exhibition. For example, a Key Delivery Message (KDM) is defined in the specifications proposed by the Digital Cinema Initiatives (DCI). The Key Delivery Message (KDM) is a message that provides permission to content exhibition and a right to provide information necessary for the exhibition to a particular theater. Therefore, when data in the DCP format are reproduced with the playback device 40, for example, the management device 20 stores the KDM in the playback device 40 ahead of the content exhibition. By doing so, the content can be exhibited with the playback device 40 even when content data are encrypted.

2. Structure of Digital Cinema Package (DCP)

Figure 2:
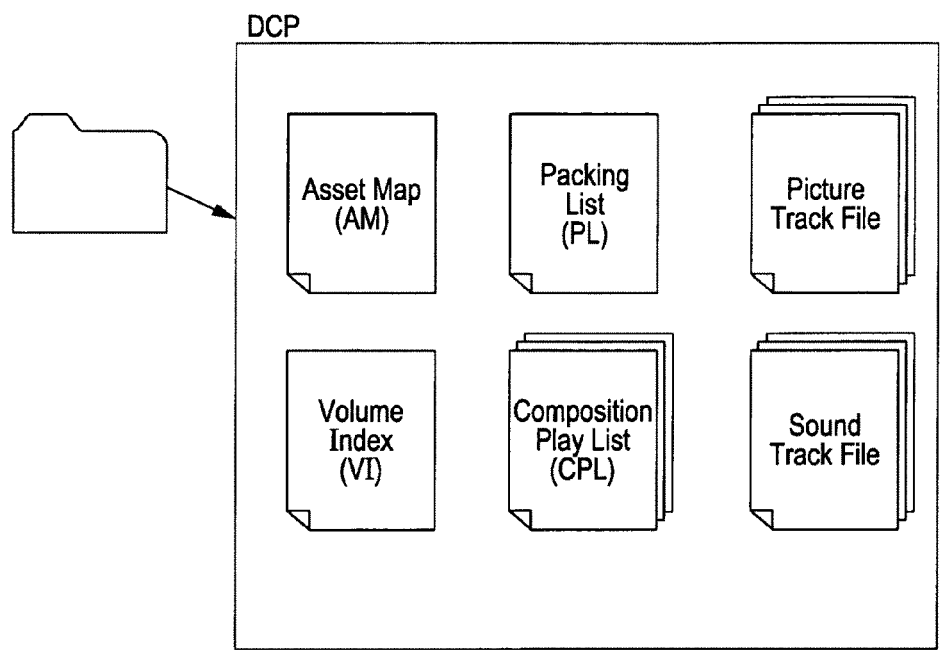
FIG. 2 is a diagram illustrating a file structure of a DCP.

Next, a file structure of a typical DCP will be described. FIG. 2 is an explanatory diagram illustrating the file structure of a typical DCP.

Contents of a digital cinema are distributed in a data format called a DCP, which is compliant with the specifications proposed by the Digital Cinema Initiatives (DCI). The DCP is a set of various types of data files necessary for exhibition of a digital cinema.

As illustrated in FIG. 2, for example, a DCP includes an asset map (AM), a volume index (VI), a packing list (PL), and a composition playlist (CPL). The DCP further includes a picture track file, a sound track file, and the like. Each of these files has assigned thereto globally unique identification information, such as a universal unique identifier (UUID), and the UUID of each file is described in the file. Now, the files constituting the DCP will be described below.

Asset Map (AM)

An asset map describes a list regarding all the files (except the asset map itself) included in one DCP. More specifically, the asset map describes a list that associates the UUIDs described in the individual files in the DCP with the file names of the files. The asset map can be used, for example, for enabling users to identify the individual files included in the DCP. The asset map is created for each digital cinema, and even when the DCP is divided as will be described later, only one asset map that is common to a plurality of divided DCPs is created for one digital cinema. A subtitle PNG file described later has a format such that it is unable to describe a UUID therein. Therefore, by describing the file names of individual PNG files in the asset map to be correlated with the UUIDs thereof, it is possible to associate the individual PNG files with their UUIDs.

Volume Index (VI)

A volume index describes index information for identifying individual divided units in a case where a DCP is divided into a plurality of divided units (divided DCPs).

Packing List (PL)

A packing list describes a list that correlates the UUIDs of all the files (except the PL itself) included in one DCP with their hash values. The hash values are values obtained by hashing data of the individual files in the DCP. The hash values of individual files described in the packing list are compared with hash values of the individual files which are actually calculated, thus checking the degree of coincidence, whereby the integrity (e.g., whether or not data have been corrupted) of the individual files can be verified.

Composition Play List (CPL)

A composition playlist (hereinafter referred to as a "CPL") is a playlist used for exhibition of contents (pictures, sound, and subtitles) included in the DCP. The CPL is link information that correlates picture track files and sound track files (and/or subtitle track files) corresponding to each exhibition version of a digital cinema with each other. The CPL is created for each exhibition version of one digital cinema.

The CPL describes the UUIDs, data entry points, and durations of the individual files for all the reels, the files including picture track files, which are picture files, sound files, and/or subtitle files. The reels herein refer to units that are formed by dividing, in time, one exhibition unit which includes picture and sound (and subtitles as necessary). For example, in a case where one digital cinema (120 minutes) is divided equally, in time, into 10 units, 10 reels (12 minutes each) are created. The entry points are offsets representing exhibition start points of data of picture or sound files of the individual reels. The durations are size information representing the valid ranges of data from the entry points.

In a case where one digital cinema is composed of a plurality of reels, CPL describes information regarding all the reels (UUIDs of picture, sound, and subtitle files constituting the individual reels, and entry points and durations thereof), and all the reels constitute one unit of playing. Usually, a digital cinema is composed of a plurality of reels, so that reel information regarding all the reels is described together in one CPL.

An exhibition version refers to one exhibition unit of a digital cinema, such as a language version (e.g., an English-sound version, a Japanese-sound version, or a Japanese-subtitle version). The CPL is created for each exhibition version of one digital cinema.

Picture Track File

A picture track file is a file of picture data compressed according to a predetermined format. The picture track file is provided in a number corresponding to a necessary number of reels. Furthermore, a plurality of types of picture files (e.g., a picture file for an original version and a picture file for a replacement version) may be created for the same scene.

Sound Track File

A sound track file is a file of sound data compressed according to a predetermined format. The sound track file is provided in a number corresponding to a necessary number of reels. Furthermore, a plurality of types of sound files (e.g., a sound file for an original version and a sound file for a replacement version) may be created for the same scene.

The DCP also includes files (not illustrated) for subtitle representation.

3. Configuration of Management Device and Playback Device

Figure 3:
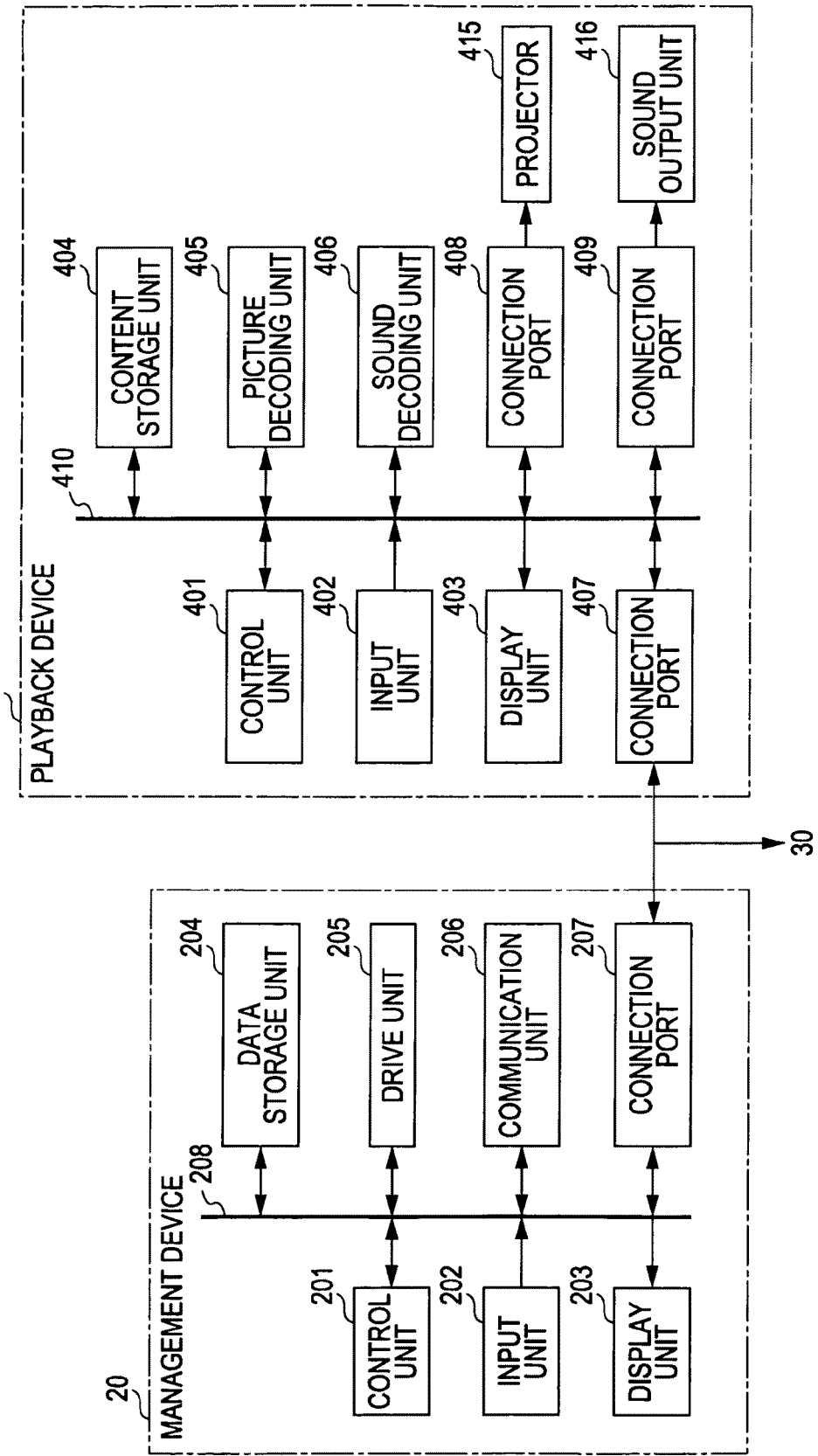
FIG. 3 is a diagram illustrating a configuration of a management device and a playback device.

FIG. 3 is a diagram illustrating a configuration of the management device 20 and the playback device 40.

The management device 20 includes a control unit 201, an input unit 202, a display unit 203, a data storage unit 204, a drive unit 205, a communication unit 206, a connection port 207, and a local bus 208 for connecting the units to each other.

The control unit 201 is configured by using a CPU, a ROM, and a RAM. The CPU executes programs stored in the ROM or programs loaded to the RAM from the data storage unit 204, thereby executing various types of processing in accordance with a user's operation based on operation signals from the input unit 202 described later. For example, the control unit 201 creates schedules and executes processing for causing the playback device 40 to perform exhibition of contents in accordance with the schedules. Moreover, the control unit 201 causes a management window and the like for managing the schedules for content exhibition to be displayed on the display unit 203 described later. Furthermore, when the requirements for exhibiting content with the playback device in accordance with the exhibition schedule are not satisfied, the control unit 201 determines an urgent level based on the number of days left until an exhibition day and switches the properties of a representation on the management window in accordance with the determined urgent level.

The ROM of the control unit 201 stores programs used by the CPU, calculation parameters, and the like. The RAM temporarily stores programs used for execution by the CPU, parameters that change appropriately during execution of the programs, and the like.

The input unit 202 is configured by using, for example, a mouse, a keyboard, a touch panel, a button, a switch, and a lever. The input unit 202 outputs an operation signal in accordance with a user's operation on the input unit 202 to the control unit 201. The user can input various types of data to the management device 20 or instruct the management device 20 to perform processing operations by operating the input unit 202.

The display unit 203 is configured by using a display device such as a liquid crystal display (LCD). For example, the display unit 203 displays a management window or the like for managing exhibition operations performed by individual playback devices 40 of the digital cinema system. The display unit may be provided separately from the management device 20.

The data storage unit 204 is configured by using, for example, a hard disk, a solid state drive (SSD), and the like. The data storage unit 204 stores various types of data, such as, for example, programs executed by the control unit 201, schedule information, logs, and show playlists.

The drive unit 205 writes or reads various types of data to/from a removable recording medium. For example, the drive unit 205 reads various types of data, such as, for example, material content of digital cinemas, DCPs, and configuration information which are recorded on the recording medium.

The communication unit 206 is a communication interface that is configured by, for example, a communication device for connecting the management device 20 to an external apparatus via a wireless or wired communication path. The management device 20 transmits/receives various types of data to/from the external apparatus via the communication unit 206. For example, the management device 20 receives data and the like of contents.

The connection port 207 is a port for connecting the management device 20 and the storage device 30 or the playback device 40 to each other. By connecting the storage device 30 or the playback device 40 to the connection port 207, various types of data can be communicated between the management device 20 and the storage device 30 or the playback device 40.

The management device 20 is not limited to the configuration illustrated in FIG. 3, but may have a configuration that the display unit is provided separately from the management device. Moreover, the drive unit and the like may be provided separately from the management device.

The playback device 40 includes a control unit 401, an input unit 402, a display unit 403, a content storage unit 404, a picture decoding unit 405, a sound decoding unit 406, connection ports 407, 408, and 409, and a local bus 410 for connecting the units to each other. The playback device 40 further includes a projector 415 and a sound output unit 416.

The control unit 401, the input unit 402, and the display unit 403 have substantially the same functional configuration as the control unit 201, the input unit 202, and the display unit 203 of the management device 20, respectively. The control unit 401 controls the respective units based on the schedule information or the like supplied from the management device 20 to perform exhibition of contents in accordance with the schedules.

The content storage unit 404 stores data of content to be exhibited. When picture data of content are compression encoded data, the picture decoding unit 405 decodes the compression encoded data. When sound data of content are compression encoded data, the sound decoding unit 406 decodes the compression encoded data. Moreover, when the picture or sound data are encrypted, the picture decoding unit 405 and the sound decoding unit 406 decrypts the encrypted picture or sound data by using a key provided from the management device 20.

The connection port 407 is a port for connecting the playback device 40 and the management device 20 or the storage device 30 to each other. With this connection port 407, various types of data can be communicated between the playback device 40 and the management device 20 or the storage device 30.

The connection port 408 is a port for connecting the projector 415. The connection port 409 is a port for connecting the sound output unit 416.

The projector 415 projects pictures of content on a screen based on picture data read from the content storage unit 404 or picture data decoded and/or decrypted by the picture decoding unit 405.

The sound output unit 416 is configured by using an amplifier, a speaker, and the like. The sound output unit 416 outputs sound of content based on sound data read from the content storage unit 404 or sound data decoded and/or decrypted by the sound decoding unit 406.

4. Operation of Management Device

In the digital cinema system 10, the control unit 201 of the management device 20 determines an urgent level based on the number of days left until the exhibition day when the requirements for exhibiting content with the playback device 40 in accordance with the exhibition schedule are not satisfied. Moreover, the control unit 201 switches the properties of a representation on the management window for managing the schedules in accordance with the determined urgent level, thereby making it easy to identify an operation that should be performed prior to other exhibition operations.

Figure 4:
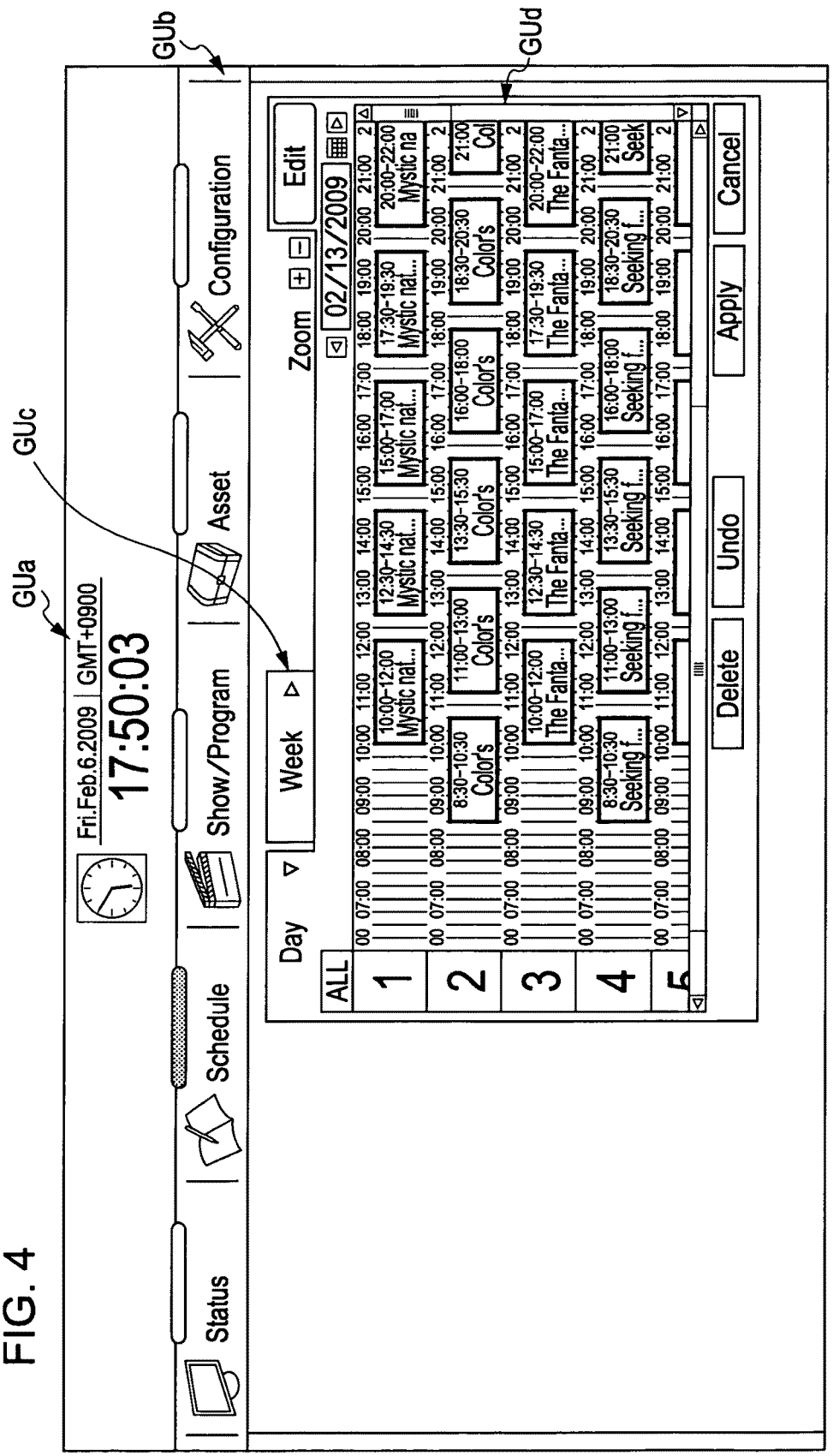
FIG. 4 is a diagram illustrating a schedule representation.

FIG. 4 illustrates a schedule representation. In the schedule representation, playback devices are displayed to be correlated with contents exhibited with the playback devices, and the properties of a representation displayed with a playback device and content exhibited by the playback device are switched in accordance with an urgent level determined for exhibition of the content. In FIG. 4, an arrangement representation is illustrated in which auditoriums are arranged in the vertical direction and representations of contents exhibited for each auditorium are arranged on the time axis in the horizontal direction. Moreover, FIG. 4 illustrates a case where the urgent level of content exhibition is determined, and the properties of a representation of content are switched in accordance with the determined urgent level.

The management window includes a representation GUa representing the current time and button representations GUb representing the menu items "Status", "Schedule", "Show/Program", "Asset", and "Configuration". Here, when the menu item "Schedule" is selected, the tabs GUc for "Day" and "Week" are displayed, for example. When the "Day" tab is selected, a schedule representation GUd for one day is displayed on the screen. In the schedule representation GUd for one day illustrated in FIG. 4, four auditoriums No1 to No4 and part of auditorium No5 are displayed to be arranged in the vertical direction. Moreover, for each auditorium, event representations which are representations of exhibited contents are arranged on the time axis in the horizontal direction at positions corresponding to their exhibition times. For example, for the auditorium No1, four event representations are displayed starting from an event which is exhibited at 10:00 to an event which is exhibited at 20:00. Moreover, scroll bars are included in the schedule representation GUd so that schedules for a desired auditorium and a desired time can be displayed by operating the scroll bars.

The menu item "Status" is an item which is selected to manage the operation status or the like of individual playback devices. The menu item "Show/Program" is an item which is selected to manage the show playlist, the CPL, and the like. The menu item "Asset" is an item which is selected to manage DCP and KDM, for example. The menu item "Configuration" is an item which is selected to perform various configurations and the like. Moreover, when the "Week" tab is selected, a schedule representation for one week is displayed on the screen.

Figure 5:
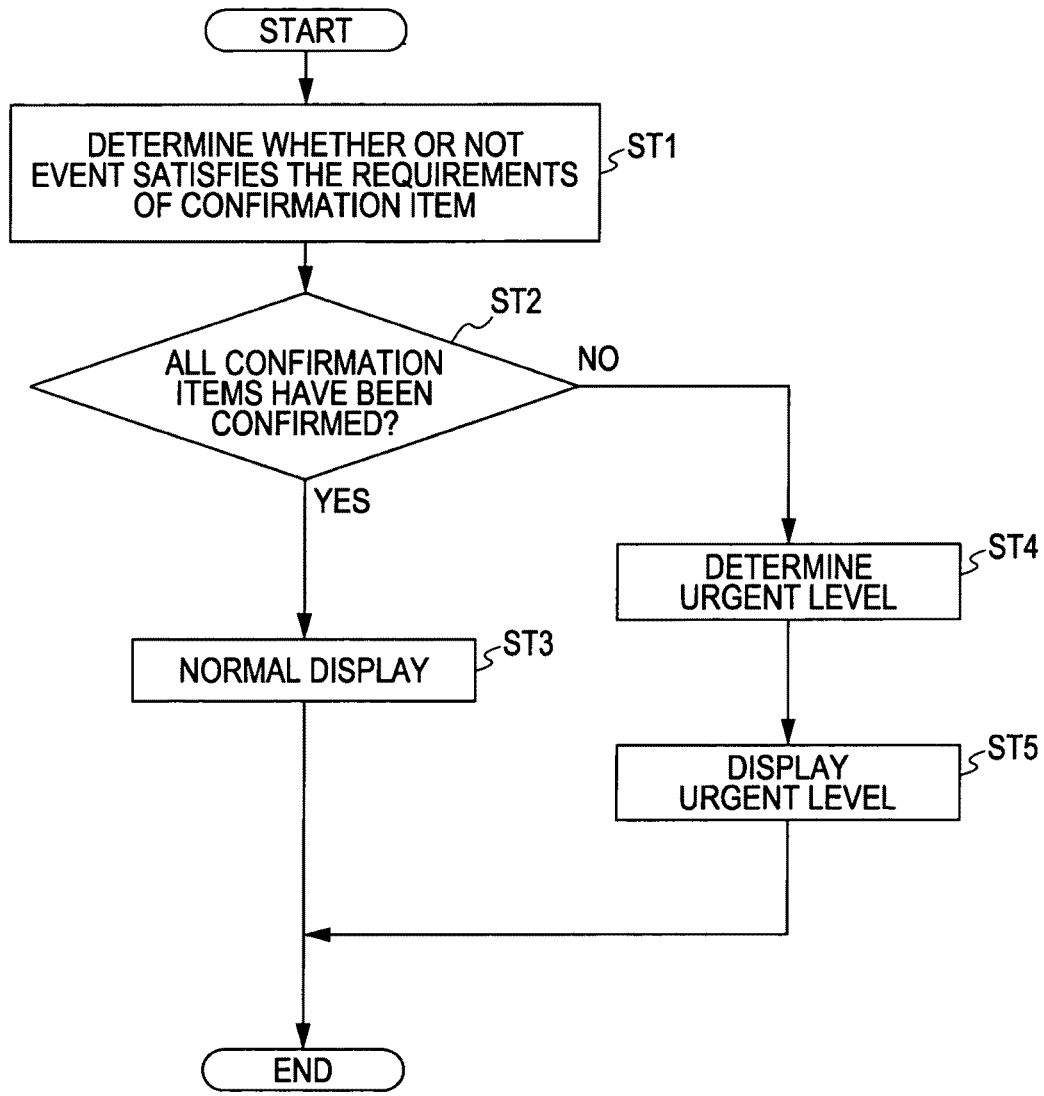
FIG. 5 is a flowchart illustrating the operation of a control unit.

FIG. 5 is a flowchart illustrating the operations of the control unit 201. At step ST1, the management device 20 determines whether or not an event satisfies the requirements of a confirmation item. The management device 20 determines whether or not each of events of which the exhibition end time is later than the current time satisfies the requirements of the following confirmation items.

Confirmation item 1: The event does not overlap with another event.

Confirmation item 2: The event is correlated with a show.

Confirmation item 3: A CPL or a program is correlated with the show of the event.

Confirmation item 4: A CPL is correlated with the program of the event.

Confirmation item 5: A key which is valid during the exhibition hours of the event is present in a playback device.

Confirmation item 6: Content necessary for the event is stored in a playback device.

The events of which the exhibition end time is earlier than the current time are displayed so as to be able to identify that they are not related to an urgent level because they have already been exhibited. For example, the events are displayed with gray which is different from the color representing the urgent level described later and the color representing a normal state.

At step ST2, the management device 20 determines whether or not the event satisfies the requirements of all the confirmation items. When the management device 20 has determined that the requirements of all the confirmation items have been satisfied, the process flow proceeds to step ST3. When the requirements of any of the confirmation items are not satisfied, the process flow proceeds to step ST4.

At step ST3, the management device 20 performs a normal display. When the requirements of all the confirmation items are satisfied, the management device 20 determines that all preparations for exhibition have been completed and changes a background color of the event representation to white, for example, representing a normal state, and the process flow ends.

At step ST4, the management device 20 determines an urgent level. The management device 20 determines the urgent level based on the number of days left until the exhibition day by using a check table.

FIGS. 6A to 6C illustrate check tables. FIG. 6A illustrates an Event check table. The Event check table is a check table which is used for determining the urgent level when the requirements of any one of the confirmation items 1 to 4 are not satisfied. FIG. 6B illustrates a DCP check table. The DCP check table is a check table which is used for determining the urgent level when the requirements of the confirmation item 6 are not satisfied. FIG. 6C is a KDM check table. The KDM check table is a check table which is used for determining the urgent level when the requirements of the confirmation item 5 are not satisfied.

In FIGS. 6A to 6C, three statuses, "Fatal Status", "Error Status" and "Warning Status" are set as the status concerning the urgent level, in which the "Fatal Status" is set with Urgent Level 3, the "Error Status" is set with Urgent Level 2, and "Warning Status" is set with Urgent Level 1. The "Fatal Status" is a state where it is necessary to take immediate measures so that no problem is caused to an exhibition. The "Warning Status" is a state where a problem may be caused to an exhibition unless appropriate measures are taken even though no immediate measures are necessary. The "Error Status" is an intermediate state between "Fatal Status" and "Warning Status" and is a state where an operator is able to make preparations for an exhibition.

In the check tables, a threshold value (number of days) is set so that it is possible to identify whether a present status corresponds to any of the three statuses "Fatal Status", "Error Status", and "Warning Status". The present status is identified based on a comparison result between the threshold value and the number of days left until the exhibition day, and the urgent level is determined based on the determination result.

Various processing times are necessary until the content data are stored in the playback device 40. For example, the time until the content data arrive at a theater, the time for copying the content data to the storage device 30, and the time for transferring and storing the content data from the storage device 30 to the playback device 40 are necessary. Therefore, the threshold values Md and Nd in the DCP check table illustrated in FIG. 6B are set in consideration of these times. For example, when the day on which the content data arrive at a theater is 4 to 5 days ahead of the exhibition starting day, the threshold values in the DCP check table are set as "Md=2" and "Nd=5."

When these threshold values Md and Nd are set to such values and the requirements of the confirmation item 6 are not satisfied, the urgent level for the present status is determined as Urgent Level 1 if the current time is 5 days or more before the exhibition day as illustrated in FIG. 7A. Moreover, the urgent level for the present status is determined as Urgent Level 2 if the current time is between 5 and 3 days before the exhibition day. Furthermore, the urgent level for the present status is determined as Urgent Level 3 if the current time is 2 days or less before the exhibition day.

Similar to the content data, various processing times are necessary until a key is stored in the playback device 40. For example, the time until the key arrives at a theater, the time for copying the key to the storage device 30, and the time for transferring and storing the key from the storage device 30 to the playback device 40 are necessary. Therefore, the threshold values Mk and Nk in the KDM check table illustrated in FIG. 6C are set in consideration of these times. For example, when the day on which the key arrives at a theater is 2 to 3 days ahead of the exhibition starting day, the threshold values in the KDM check table are set as "Mk=2" and "Nk=3."

When these threshold values Mk and Nk are set to such values and the requirements of the confirmation item 5 are not satisfied, the urgent level for the present status is determined as Urgent Level 1 if the current time is 3 days or more before the exhibition day as illustrated in FIG. 7B. Moreover, the urgent level for the present status is determined as Urgent Level 2 if the current time is 3 days before the exhibition day. Furthermore, the urgent level for the present status is determined as Urgent Level 3 if the current time is 2 days or less before the exhibition day.

Moreover, the threshold values Me and Ne are set for the Event check table in accordance with the confirmation items 1 to 4.

Figure 8:
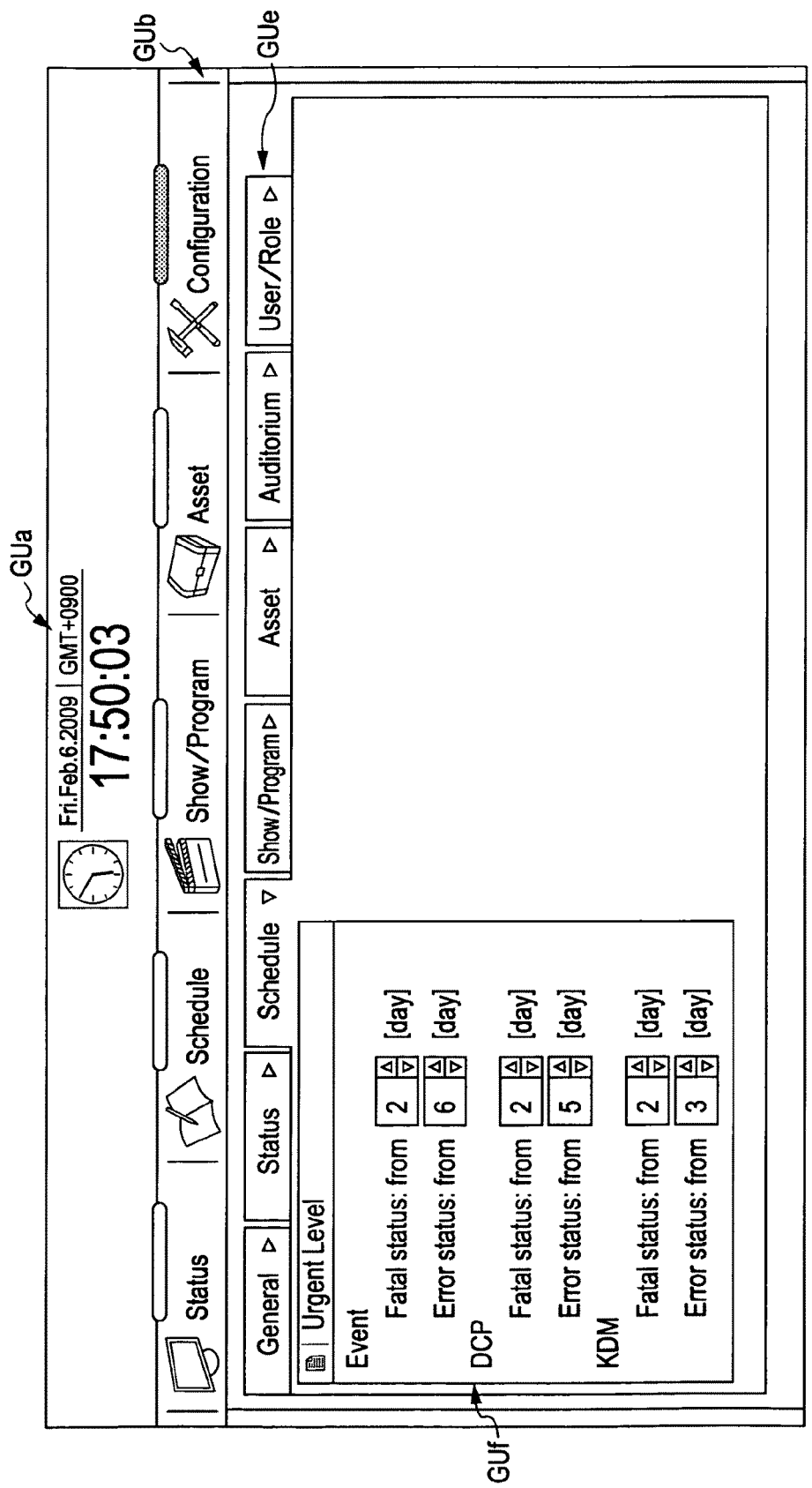
FIG. 8 is a diagram illustrating an urgent level setting representation.

FIG. 8 illustrates an urgent level setting representation. In the urgent level setting representation, the threshold values Me and Ne in the Event check table, the threshold values Md and Nd in the DCP check table, and the threshold values Mk and Nk in the KDM check table can be set.

As illustrated in FIG. 8, when the menu item "Configuration" is selected, the above-described seven tabs GUe are displayed. Here, when the "Schedule" tab is selected, the urgent level setting representation GUf is displayed on the screen.

In the urgent level setting representation GUf, an upward spin control arrow and a downward spin control arrow are provided for each of the threshold values Me, Ne, Md, Nd, Mk, and Nk in the check tables. Moreover, in the urgent level setting representation GUf, the threshold value can be increased or decreased by operating the spin control arrows. Therefore, the exhibition operator is able to set the threshold value to a desired number of days by operating the spin control arrows. The threshold value may be set through a number input operation as well as operation with the spin control arrows. In FIG. 8, "Event Fatal Status" corresponds to the threshold value Me, and "Event Error Status" corresponds to the threshold value Ne. Moreover, "DCP Fatal Status" corresponds to the threshold value Md, and "DCP Error Status" corresponds to the threshold value Nd. Furthermore, "KDM Fatal Status" corresponds to the threshold value Mk, and "KDM Error Status" corresponds to the threshold value Nk.

In this way, the control unit 201 determines the urgent level for the confirmation items, the requirements of which are not satisfied.

Returning now to FIG. 5, at step ST5, the control unit 201 displays the urgent level based on the urgent level determined at step ST4. The control unit 201 selects the highest urgent level for each event from the urgent levels determined for the confirmation items, the requirements of which are not satisfied, and uses the selected urgent level as the urgent level of the event. For example, when the requirements of the confirmation items 5 and 6 are not satisfied as illustrated in FIGS. 7A and 7B, if the current time is 4 days before the exhibition day, the urgent level for the present status is determined as Urgent Level 2 in the DCP check table and Urgent Level 1 in the KDM check table. In this case, since the Urgent Level 2 is the highest, the Urgent Level 2 is used as the urgent level of the event.

In addition, the control unit 201 switches the properties of the event representation in accordance with the urgent level of the event so that the urgent level of the content exhibited can be identified. FIG. 9 illustrates switching of representation properties based on the urgent level. For example, the background color of the representation is switched in accordance with the urgent level. In FIG. 9, the background color for the urgent level 3 is set to "Red", the background color for the urgent level 2 is set to "Orange", and the background color for the urgent level 1 is set to "Yellow".

Figure 10:
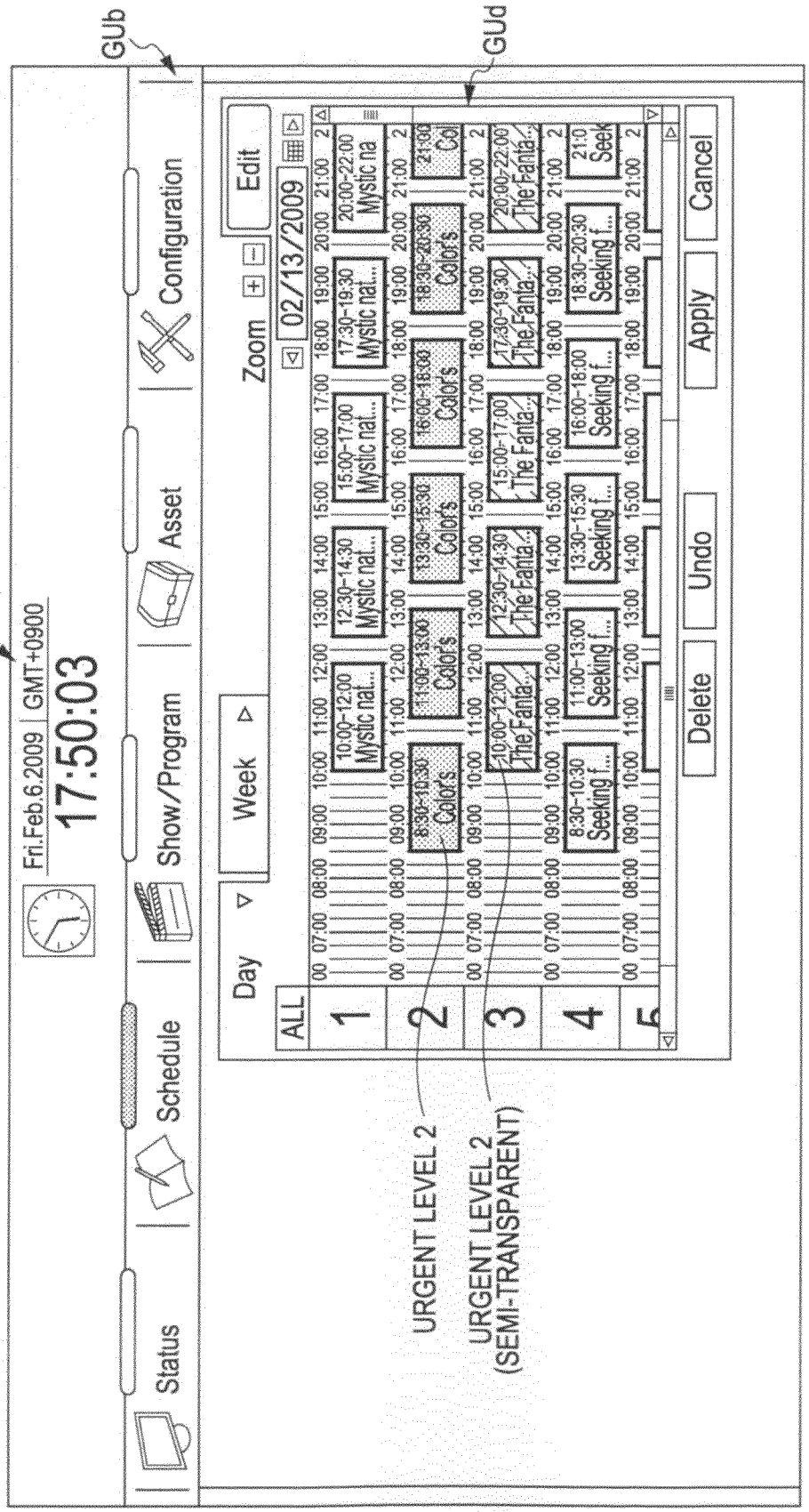
FIG. 10 is a diagram illustrating a case where a background color of an event is changed in accordance with an urgent level.

FIG. 10 illustrates a case where the background color of the event representation in the schedule representation is changed in accordance with the urgent level. When the contents exhibited in the auditoriums No1, No4, and No5 satisfy the requirements of all the confirmation items, the background colors of the event representations are set to white. Moreover, when the confirmation items, the requirements of which are not satisfied are identified for the contents exhibited in the auditoriums No2 and No3, the urgent level is determined for each of the confirmation items of which the requirements are not satisfied. Furthermore, the background color is set in accordance with the highest urgent level of the determined urgent levels. For example, when the highest urgent level for the contents exhibited in the auditoriums No2 and No3 is the Urgent Level 2, the background color of the event representation is set to "Orange".

In this way, by changing the background color of the event representation in the schedule representation in accordance with the urgent level, it is possible to identify easily which event necessitates immediate measures.

However, when the background color of the event representation is changed in accordance with the urgent level, it is difficult to identify the confirmation item of which the requirements are not satisfied. A representation representing the requirements that are not satisfied may be displayed in the management window. For example, the transparency of the representation may be switched in accordance with the confirmation item of which the requirements are not satisfied. Moreover, when the urgent level is displayed, a ToDo list representing the relationship between the confirmation item of which the requirements are not satisfied and contents, schedules, and the like may be displayed so that it is possible to identify the confirmation item of which the requirements are not satisfied.

FIG. 10 illustrates a case where the transparency of a representation is switched in accordance with the confirmation item of which the requirements are not satisfied. For example, since a show is not correlated with the contents exhibited in the auditorium No3, the background of the representation is displayed with a semi-transparent color when the requirements of the confirmation item 2 are not satisfied. By doing so, it is possible to identify the confirmation item of which the requirements are not satisfied.

Figure 11:
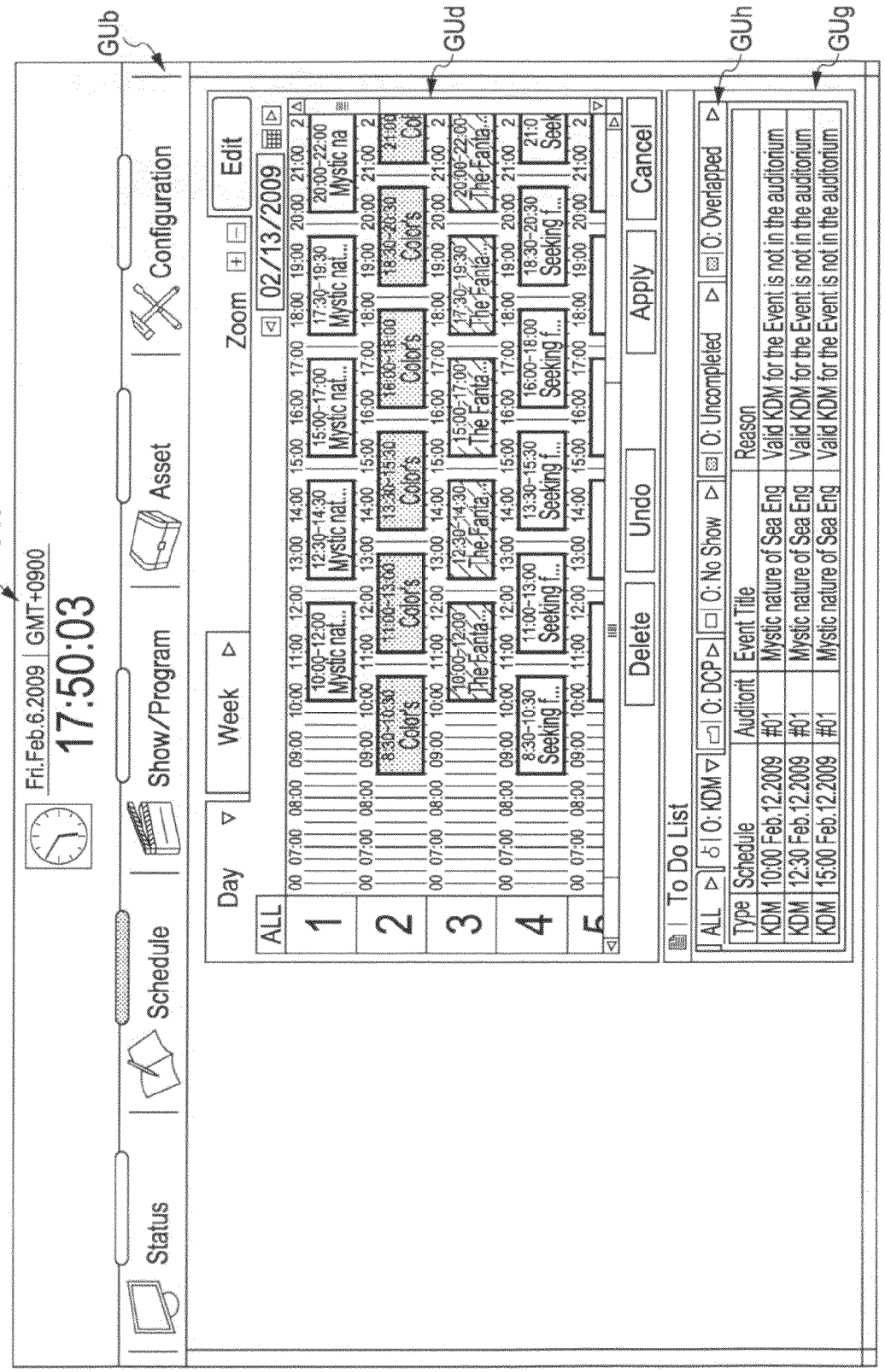
FIG. 11 is a diagram illustrating a case where a schedule representation and a ToDo list representation are displayed on a screen.

FIG. 11 illustrates a case where a schedule representation and a ToDo list representation are displayed on the screen. In the ToDo list representation GUg, six tabs GUh, for example, are displayed. Specifically, the tabs "All", "KDM", "DCP", "No Show", "Uncompleted", and "Overlapped" are displayed.

When the "All" tab is selected, the control unit 201 displays the confirmation items of which the requirements are not satisfied, the contents, the schedule, and the like with respect to all the confirmation items. When the "KDM" tab is selected, the control unit 201 displays the confirmation items of which the requirements are not satisfied, the contents, the schedule, and the like with respect to the confirmation item 5. When the "DCP" tab is selected, the control unit 201 displays the confirmation items of which the requirements are not satisfied, the contents, the schedule, and the like with respect to the confirmation item 6. When the "No Show" tab is selected, the control unit 201 displays the confirmation items of which the requirements are not satisfied, the contents, the schedule, and the like with respect to the confirmation item 2. When the "Uncompleted" tab is selected, the control unit 201 displays the confirmation items of which the requirements are not satisfied, the contents, the schedule, and the like with respect to the confirmation items 3 and 4. When the "Overlapped" tab is selected, the control unit 201 displays the confirmation items of which the requirements are not satisfied, the contents, the schedule, and the like with respect to the confirmation item 1.

In the ToDo list representation GUg illustrated in FIG. 11, the case is illustrated where the "KDM" tab is selected. In the ToDo list representation GUg, "Type" represents the confirmation item of which the requirements are not satisfied, and a character "KDM" is displayed indicating that the requirements of the confirmation item 5 are not satisfied. Moreover, "Schedule" represents the exhibition starting time of an event which does not satisfy the requirements of the confirmation item 5, "Auditorium" represents the auditorium, and "Event Title" represents the title of an event. Furthermore, "Reason" represents the details of the confirmation item of which the requirements are not satisfied.

By displaying the ToDo list representation in this manner, when the urgent level appears on the screen, it is possible to identify the confirmation item of which the requirements are not satisfied.

Furthermore, in the representation that correlates the playback devices and the contents exhibited with the playback devices and the representation representing the requirements that are not satisfied, the contents displayed with their urgent levels are displayed to be correlated with the requirements that are not satisfied when the urgent level is determined. That is to say, when the schedule representation and the ToDo list representation are displayed, the contents displayed with their urgent levels may be displayed to be correlated with the requirements which are not satisfied when the urgent level is determined. By displaying the representations in a correlated manner, the confirmation item having a high urgent level can be easily identified for each content.

Figure 12:
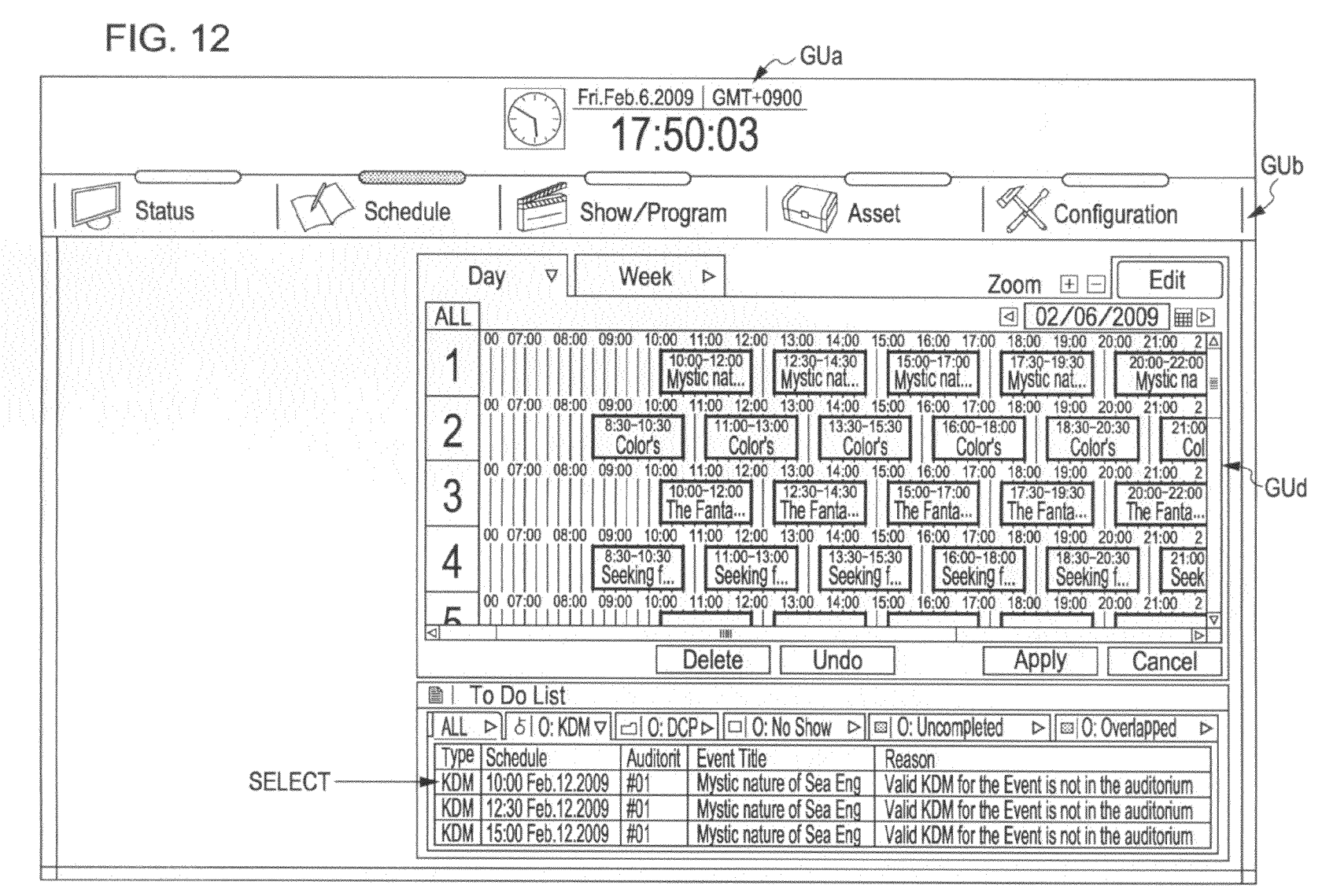
Figure 13:
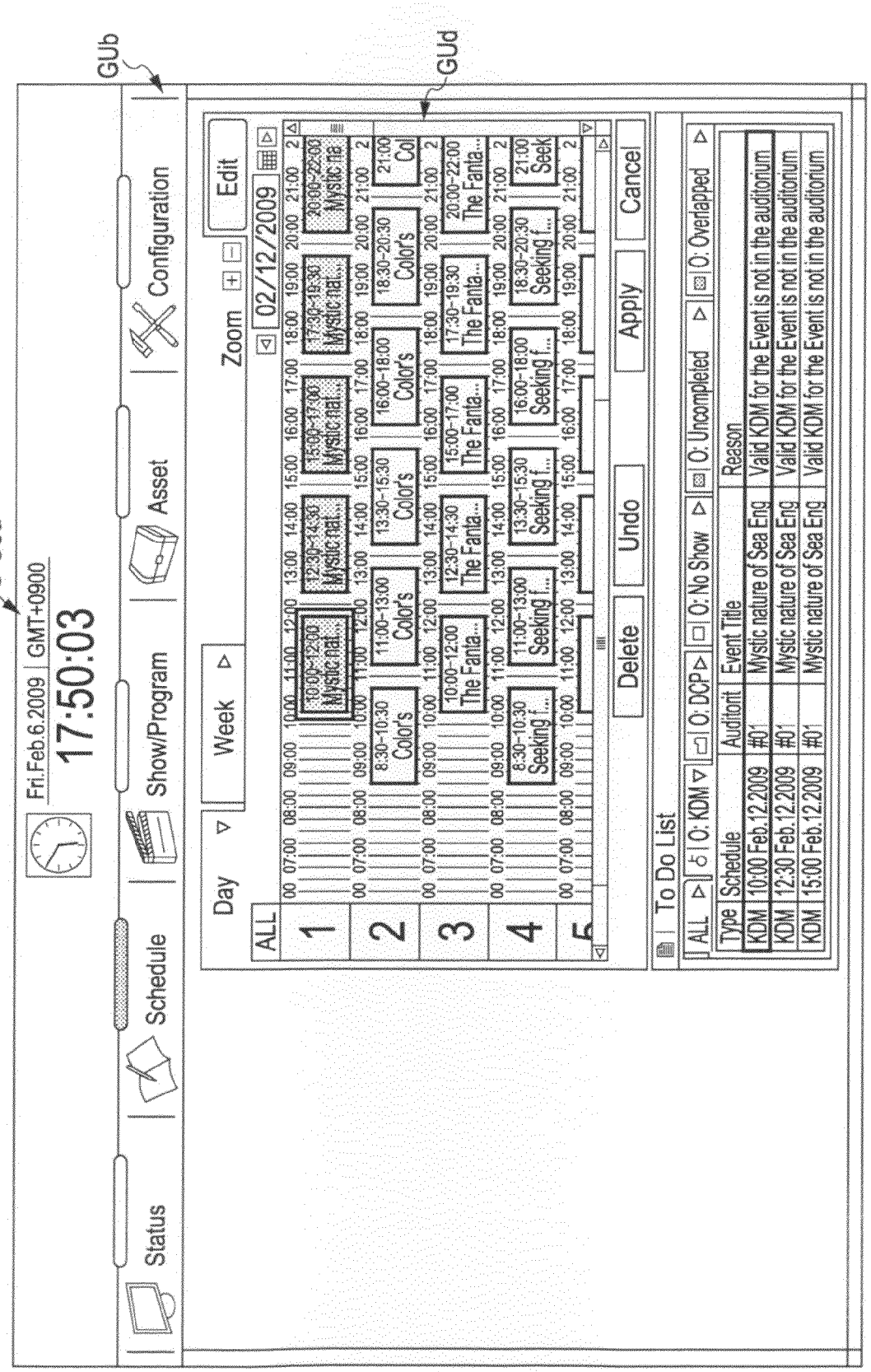
FIG. 13 is a second diagram illustrating a case where the schedule representation and the ToDo list representation are linked together.

FIGS. 12 and 13 illustrate the case where the schedule representation and the ToDo list representation are correlated with each other.

For example, when a list representation on the top row is selected in the ToDo list representation of FIG. 12, the display date in the schedule representation is switched to the scheduled date described in the selected list representation. Here, when the list representation on the top row is selected, since the scheduled date of the list representation is February 12, as illustrated in FIG. 13, the schedule representation GUd is switched to the schedules for February 12. Moreover, in the switched schedule representation GUd, the representation of the content is switched so that it is possible to identify that the content is linked to the content selected from the ToDo list representation. For example, the content is displayed in the same manner as the selected list representation. Although FIG. 13 illustrates a case where the content representation is surrounded by a double-line frame, the representation colors may be switched to the same color. In this way, when certain content is selected from the ToDo list representation, a representation for the exhibition day of the selected content is displayed in the schedule representation that correlates the playback devices with the contents exhibited with the playback devices. Therefore, it is possible to identify easily the correlation between the urgent level and the requirements that are not satisfied.

Furthermore, although not illustrated in the drawing, when an event representation is selected in the schedule representation, a list representation correlated with the selected event representation may be displayed in the ToDo list representation.

In this way, when the schedule representation and the ToDo list representation are linked to each other, it is possible to identify easily the relationship between the event representation and the confirmation item of which the requirements are not satisfied.

In the described embodiment, the urgent level is displayed in the schedule representation. However, the urgent level may be displayed in a different management window than the schedule representation. For example, a DCP/KDM list representation GUj illustrated in FIG. 14 may be used. The DCP/KDM list representation is a list representation that shows contents and key statuses by correlating the contents with keys. In the DCP/KDM list representation, the properties of a representation are switched based on an urgent level which is determined from the number of days left until the exhibition day or the key status so that it is possible to identify the contents, the key status, and the urgent level. The DCP/KDM list representation GUj illustrated in FIG. 14 has an arrangement representation in which the storage device and the auditoriums are the column items, and the contents or the keys are the row items.

In the DCP/KDM list representation, the following four statuses are displayed as a content status, for example.

Content status 1: Whether or not content data are stored in the storage device 30 and the playback device 40 in each auditorium.

Content status 2: Whether or not content data are encrypted.

Content status 3: Whether or not content contains 3D pictures.

Content status 4: The urgent level of content preparation relative to a schedule.

In the DCP/KDM list representation, the following five statuses are displayed as a KDM status, for example.

KDM status 1: Whether or not a key is stored in the storage device 30 and the playback device 40 in each auditorium.

KDM status 2: Whether or not a key is valid at the current time.

KDM status 3: The status of a valid period of a key.

KDM status 4: The urgent level of key preparation relative to a schedule.

KDM status 5: The valid period of a key.

The management device 20 displays the content statuses 1 to 3 using icons such as a reel image so that the content status can be identified. Moreover, the management device 20 displays the KDM statuses 1 to 3 using icons such as a key image so that the KDM status can be identified. That is to say, the control unit 201 of the management device 20 inserts an icon at an arrangement position defined by the playback device or the like of an auditorium and content or the like to be exhibited, the icon representing a status of content which corresponds to the arrangement position and which is played by the playback device corresponding to the arrangement position. Moreover, the control unit 201 of the management device 20 inserts an icon at an arrangement position defined by the playback device or the like of an auditorium and content or the like to be exhibited, the icon representing a status of a key used when decoding the content which corresponds to the arrangement position by the playback device corresponding to the arrangement position.

Moreover, for the content status 4 and the KDM status 4 which are related to the urgent level, the urgent level is determined by the method described with reference to FIGS. 10 and 11 similar to the case where the requirements of the confirmation items 5 and 6 are not satisfied.

The management device 20 switches the properties of the DCP/KDM list representation in accordance with the determined urgent level. For example, the background color of a corresponding representation region is switched in accordance with the urgent level so that the background colors are set to "Red" for Urgent Level 3, "Orange" for Urgent Level 2, and "Yellow" for Urgent Level 1.

By doing so, the urgent level can be displayed on a different management window than the schedule representation. Therefore, it is possible to give priorities to operations based on the urgent level and thus effectively to perform operations in optimum procedures. Moreover, it is possible to reduce operation errors when displaying a list of operations necessary for an exhibition.

The digital cinema management device and the digital cinema management method according to the embodiment of the present invention may be implemented by a computer device. In this case, a computer program for causing the computer device to function as the digital cinema management device may be provided, for example, in a computer-readable format to a general computer system capable of executing various computer codes. For example, the computer program may be provided in the form of a storage medium such as an optical disc, a magnetic disc, or a semiconductor memory, or a communication medium such as a network. By providing the computer program in the computer-readable format, processing corresponding to the computer program is executed on the computer device, whereby the described digital cinema management device and digital cinema management method can be implemented.

It should be understood by those skilled in the art that various modifications, combinations, sub-combinations and alterations may occur depending on design requirements and other factors insofar as they are within the scope of the appended claims or the equivalents thereof.

What is claimed is:

1. A digital cinema management device comprising:
control unit that manages schedules of contents exhibited by playback devices and controls a representation of a management window for performing schedule management,
in which the control unit determines an urgent level from among a plurality of urgent levels in accordance with a number of days left until an exhibition day when a requirement or requirements for each of a plurality of confirmation items for exhibiting contents with the playback devices in accordance with an exhibition schedule are not satisfied and switches one or more properties of the representation on the management window in accordance with the determined urgent level or levels, in which the plurality of confirmation items includes one or more items pertaining to a Digital Cinema Package (DCP) matter, and in which each level of the plurality of urgent levels has one or more days associated therewith which are different for each said level.

2. The digital cinema management device according to claim 1, in which the plurality of check items further includes one or more items pertaining to a Key Delivery Message (KDM).

3. The digital cinema management device according to claim 1, wherein the control unit displays the playback devices and contents to be exhibited by the playback devices in the management window in a correlated manner and switches the properties of a representation displayed with the playback devices and the contents exhibited by the playback devices in accordance with the urgent level determined for exhibition of the content.

4. The digital cinema management device according to claim 3, wherein the control unit compares a preset threshold value with the number of days left until the exhibition day and determines the urgent level in accordance with a comparison result.

5. The digital cinema management device according to claim 3, wherein the control unit displays an arrangement representation in the management window, in which representations representing the exhibited contents for each playback device are arranged on a time axis, and switches the properties of the representations of the contents in accordance with the urgent level determined for the exhibition of the content.

6. The digital cinema management device according to claim 5, wherein the control unit switches a representation color in accordance with the determined urgent level.

7. The digital cinema management device according to claim 3, wherein the control unit displays a representation representing the requirements that are not satisfied in the management window.

8. The digital cinema management device according to claim 7, wherein the control unit displays the representation representing the requirements that are not satisfied for each content for which the requirements are not satisfied, and when certain content is selected from the displayed contents, a representation for an exhibition day of the selected content is displayed in the representation that correlates the playback devices with the contents exhibited by the playback devices.

9. The digital cinema management device according to claim 7, wherein the control unit displays a representation that correlates the playback devices with the contents exhibited by the playback devices and the representation representing the requirements that are not satisfied so that contents displayed with urgent levels thereof are displayed to be correlated with the requirements that are not satisfied when the urgent level is determined.

10. The digital cinema management device according to claim 9, wherein the control unit switches a transparency of a representation of the content when the requirements that are not satisfied when the urgent level is determined are predetermined requirements.

11. A digital cinema management method comprising the steps of:

causing a display unit to display a management window for managing schedules of contents exhibited by playback devices; and causing a control unit to determine an urgent level from among a plurality of urgent levels in accordance with a number of days left until an exhibition day when a requirement or requirements for each of a plurality of confirmation items for exhibiting contents with the playback devices in accordance with an exhibition schedule are not satisfied and switch one or more properties of a representation on the management window in accordance with the determined urgent level or levels, in which the plurality of confirmation items includes one or more items pertaining to a Digital Cinema Package (DCP) matter, and in which each level of the plurality of urgent levels has one or more days associated therewith which are different for each said level.

12. The digital cinema management method according to claim 11, in which the plurality of check items further includes one or more items pertaining to a Key Delivery Message (KDM).

* * * * *